Patented Mar. 3, 1931

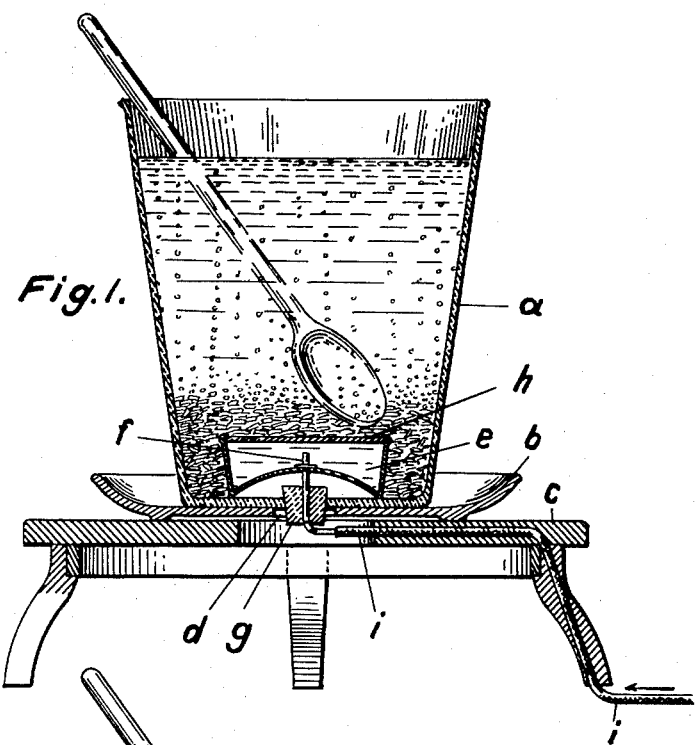
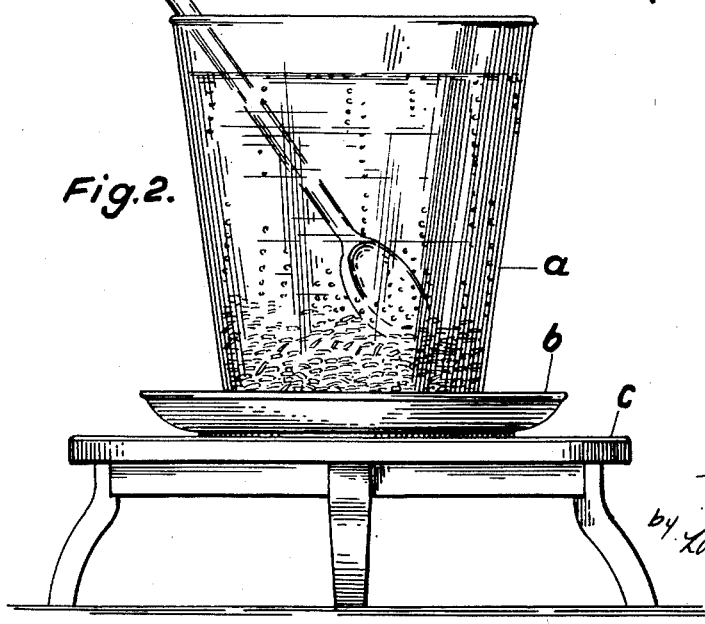

1,795,128

UNITED STATES PATENT OFFICE

PHILIPP HÖNIG, OF BERLIN, GERMANY

APPARATUS FOR DEMONSTRATION AND ADVERTISING PURPOSES

Application filed July 28, 1926, Serial No. 125,573, and in Germany August 12, 1925.

The present invention relates to improvements in method and apparatus for demonstrating chemical reactions.

When selling chemical and pharmaceutical compounds it is often of importance that one at once is able to demonstrate the properties of the substance in question for the interested persons or the parties concerned, for instance substances in which it is of importance that an intense production of gas, for instance, carbonic acid, is obtained, it is of importance to demonstrate such production practically. At such demonstrations hitherto small amounts of the products in question, for instance uricidine or other substances were dissolved in a glass receptacle, so that it is perceptible from the development of the carbonic acid set free, that the product is an effective one, which is superior to other products. Such demonstrations are however expensive and are troublesome to the attendants, because permanently a person must be occupied with the filling of the salts and the pouring in of water, etc. An automatically working and self-filling device adapted to attract attention is hitherto not known.

The invention has adapted a new way and creates by means of a new method a new arrangement, which may replace the single demonstrations hitherto used and which will work automatically. Such a device is however satisfactory only when it acts in a manner which is fully like to that which is observed at the real reaction of the substances which are to be recommended or at least so like that professionals, physicians, etc., become attentive.

The invention is based upon the consideration, that it is not necessary to bring about the reaction positively. It is sufficient for the purpose set, to imitate the reaction by means of cheaper substances.

The problem which is to be solved, is solved by means of the new method. The inventor has by experiments ascertained, that for instance permeable filter plates, such as the so-called Scott filter plates of sintered glass or other suitable filter plates of clay or other materials may be employed with a very good result for dispersing gases, air bubbles and the like.

If for instance such sintered glass plate is arranged as a cover of a gas-conduit, an ascending gas current of a peculiar form will be visible in a body of water arranged above the filter plate. This gas current, respectively the form of the same, is exactly like that which is created when a gas producing salt or other product is mixed with a liquid, which sets the gas free. The air penetrates the sintered glass plate through all pores in the form of thousands of small bubbles, which pass upward to the surface of the liquid above the plate in violently whirling currents, which give the impression that an intense reaction takes place in the vessel. This observation is utilized by the inventor in the present invention.

The method may for instance be carried into effect by means of the device shown in the accompanying drawing in which Fig. 1 is a vertical section through a container, and Fig. 2 is a side view of the same.

The demonstration is performed by means of a large glass vessel $a$, which may be a bottle, a drinking-glass, a basin or the like. According to the shown example a drinking-glass is used, which has a height of 30–40 centimetres. The glass is arranged upon a plate $b$ which again is placed upon a small frame, chair or table $c$, etc.

The glass has a central boring $d$, and this boring is continuated through the plate and the table. In the glass $a$ a receptacle $e$ of a suitable sheet metal, porcelain or the like is arranged. The receptacle $e$ has a curved bottom at a central point of which a tube $f$ is inserted and air-tight connected to the bottom. The lower end of the tube $f$ is passed through a rubber plug $g$ or another packing in the bottom of the container $a$ and the upper end of the tube terminates in the interior hollow space of the receptacle $e$. The open end of the receptacle $e$ is closed by means of a suitable plate, for instance a filter plate of sintered glass or the like, which is cemented to the rim of the receptacle, so that the interior of the same, except through the glass plate $h$ is completely closed.

To the tube $f$ a conduit $i$ is connected which through the frame or the table or a table leg is invisibly passed to an air pump, compressor or the like. Suitably the conduit $i$ is connected to one of the known small air pumps, which may be connected to a common water pipe in such a manner, that the pipe may be used and the effect of the air-pipe may be easily controlled.

When the entire device, which is arranged in the glass and which is visible from the outside of the same, is covered by a suitable material and the glass is filled up to a certain height with water, the arrangement may serve as an effective apparatus for imitating chemical reactions. A suitable filling material is for instance broken up chips or splints of marble, which when covered by water and seen from the outside of the glass will look like a salt also to professionals. The filling material or substance must of course be indifferent to the gas passing through the same, that is, it must not be chemically acted on by the gas.

The filling substance is arranged in such a manner, that it completely covers the gas chamber and the accessories of the same. Such accessories are the curved bottom shown in Fig. 1 of the drawing, the tube $f$, the packing between this tube and the said curved bottom and the rubber plug $g$.

When by means of an air pump or a compressor air is admitted to the receptacle $e$ through the tube $i$, the air will disperse under the permeable glass plate $h$, which also may be replaced by other plates for instance by a suitable plate of clay. The air penetrates the porous filter plate and passes as numerous small bubbles through the marble particles. From the intermediate spaces between these particles the air finally ascends to the surface of the water as numerous whirling bubbles. By regulating the water supply to the air pump the reaction can be made more or less intense, according as this is desired in view of the chemical reaction which is to be imitated. By means of admixtures the water may be coloured in any desired colour, so that also fermentations and similar processes may be shown.

As a water supply is always at hand in a dispensary or similar localities, it is very easy to connect a suitable air pump to the water pipe. If an air pump is not at hand a suitable medium for gas production may be produced by means of water power or gas pressure tanks.

Such a device is not only suited for demonstrating chemical reactions, but may also be employed for other purposes. The vessel $a$ and the receptacle $e$ need of course not be of the form shown in the drawing, although the same is rather practical in use, because it may easily be covered by the marble chips or powder. If desired a large spoon may be placed into the glass, in order to illustrate the use of a stirring spoon. Such spoon is prepared from a material, which is resistive to the developed gas and the liquid in the glass.

The same method and a corresponding device may serve for enriching a liquid, a jelly, a powder or another substance with a gas or for bringing a gas into intimate contact with a substance in order to exert a chemical, technical or mechanical effect upon the substance in question. The method may also be used for enriching baths with a gas shower, air, carbonic acid or the like. Further a gas shower of any kind or intensely cooled air may be introduced into a liquid or mass of high temperature, in order to effect a speedy cooling of the same. An accelerated cooling is very important, for instance when hardening fat, honey, etc. The gases may be introduced in order to bring forth a decomposing, enriching or heating effect, to accelerate a fermentation, to prevent the formation of a gas or of bacteria, to disinfect a liquid or a substance or to preserve a fluid or a substance. The introduction of gas may also serve for dyeing or decorating substances. The method is especially suited for the purification and enrichening of water as well as of petroleum and other mineral, vegetable and animal oils.

I claim:

1. A device for demonstration and advertising purposes, comprising in combination, a transparent liquid container, a transparent liquid in the liquid container, a gas chamber arranged in said liquid container, a porous cover arranged in the upper part of said gas chamber, a fluid tight connection between the edge of said cover and the rim of said gas chamber, means for forcing a gas into the gas chamber and a mass consisting of a substance indifferent to the said gas and arranged in such a manner in the said liquid container so as to cover the gas chamber with accessories.

2. A device for demonstration and advertising purposes, comprising in combination, a transparent liquid container, a transparent liquid in the liquid container, a gas chamber arranged in said liquid container, a cover of sintered glass arranged in the upper part of said gas chamber, a fluid tight connection between the edge of said cover and the rim of said gas chamber, means for forcing a gas into the gas chamber and a finely divided mass consisting of a indifferent substance arranged in the container in such a manner, so as to cover the gas chamber with accessories and making the same invisible from the outside of the container.

3. A device for demonstration and advertising purposes, comprising in combination, a drinking glass like liquid container, a plate like support for the same, a gas chamber arranged in said liquid container, a cover of sintered glass, a fluid tight connection between the edge of said cover and the rim of said gas chamber, a support for carrying the entire device, a gas tube passing through the bottom of the said liquid container as well as through the said gas chamber and the said plate like support for the liquid container, a finely divided mass consisting of an indifferent substance arranged in such a manner in the said liquid container, so as to make the gas chamber with accessories invisible from the outside of the said container, a gas tight and liquid tight packing surrounding the said gas tube, a source of gas connected to the said gas tube and means for covering the said gas tube with connections in such a manner so as to make the same invisible to spectators.

In testimony whereof I affix my signature.

PHILIPP HÖNIG.